United States Patent [19]
Lower et al.

[11] 3,785,381
[45] Jan. 15, 1974

[54] PRESSURE SENSING OBSTETRICAL FORCEPS

[75] Inventors: Brenton R. Lower; Kenneth E. Hughes, both of Columbus, Ohio; Leonard E. Laufe, Pittsburgh, Pa.

[73] Assignee: Leonard E. Laufe, Pittsburgh, Pa.

[22] Filed: Jan. 22, 1973

[21] Appl. No.: 325,502

[52] U.S. Cl............. 128/323, 73/141 R, 73/379 R, 128/361
[51] Int. Cl..... G01n 3/48, A61b 17/44, A61d 1/08, G01b 5/00
[58] Field of Search................ 128/323, 361 X, 321, 128/324, 346, 352; 73/379 R, 141 R, 141 A

[56] References Cited
UNITED STATES PATENTS

| | | | |
|---|---|---|---|
| 2,680,967 | 6/1954 | Newman | 73/379 R |
| 3,088,465 | 5/1963 | Smith | 128/323 |
| 3,665,925 | 5/1972 | Dersookian | 128/323 |
| 3,696,662 | 10/1972 | Foltz | 73/141 A |

OTHER PUBLICATIONS
Catalogue V. Mueller & Co. "Guide to Purchasing," Page 467.

*Primary Examiner*—Aldrich F. Medbery
*Attorney*—Paul Bogdon

[57] ABSTRACT

An obstetrical forceps having a pressure sensing device combined therewith is disclosed. The forceps include pivotably connectable blades, each having fetal engaging and handle portions. The pressure sensing device is constructed and arranged on the forceps to sense and indicate pressure applied to a fetus when using the forceps. The device includes a pressure sensor such as a deflectable diaphram arranged on the tip of the fetal engaging portion of the blade and a pressure indicator communicating with the diaphram through tubing or the like. The tubing is filled with an incompressible fluid, such as distilled water. When the sensor deflects as pressure is applied to a fetus, the pressure will be transmitted by the water through the tubing to the indicator.

14 Claims, 5 Drawing Figures

PATENTED JAN 15 1974 3,785,381
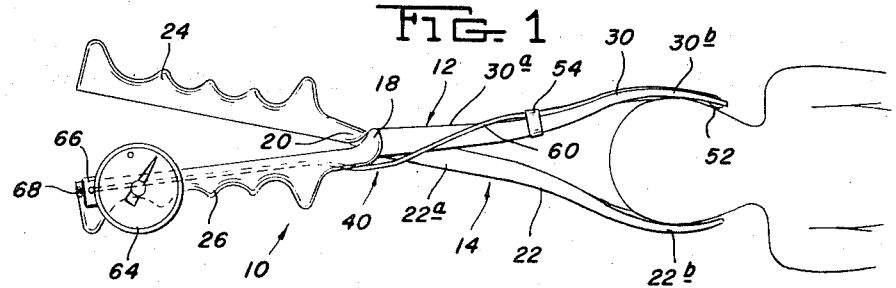
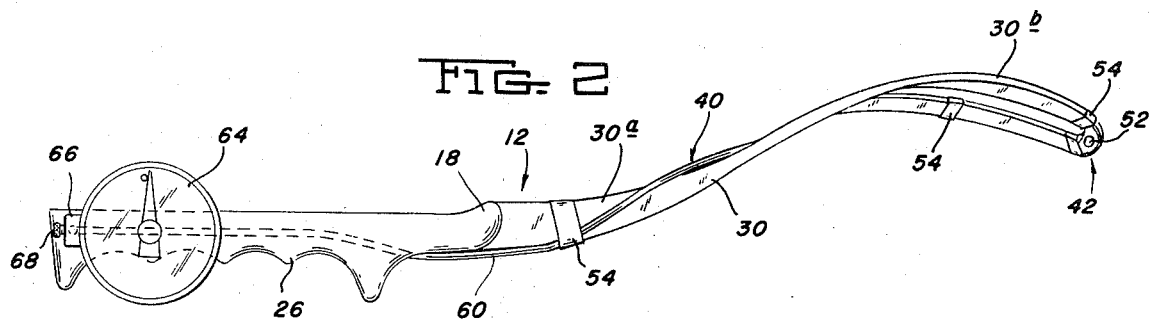
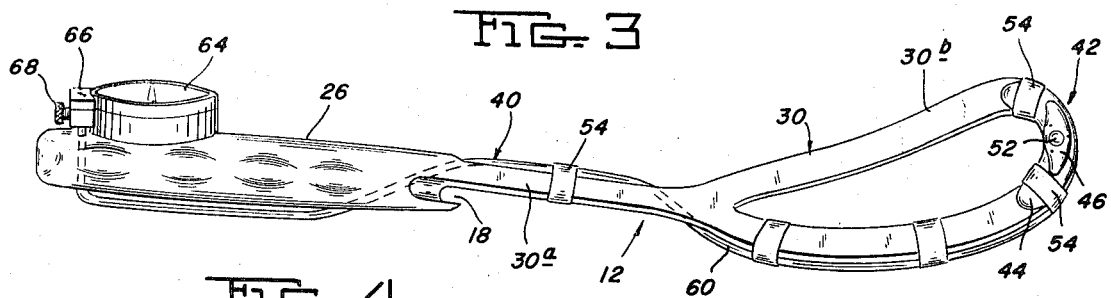
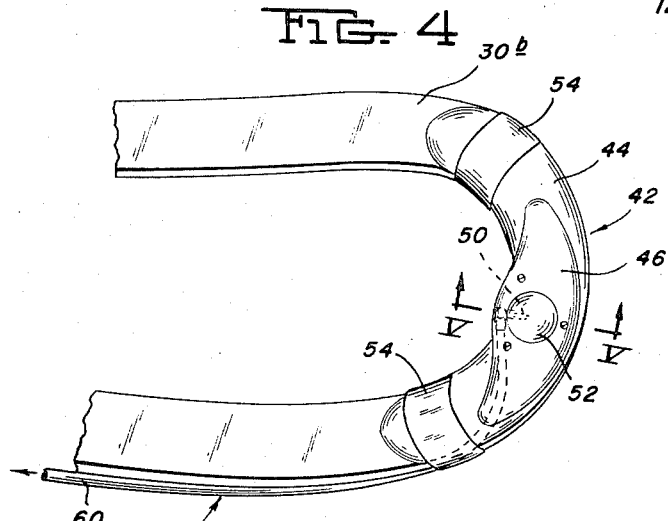
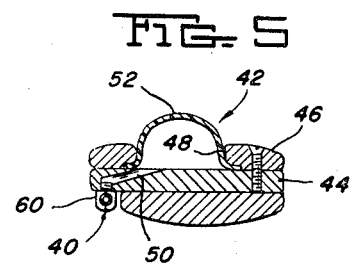

PRESSURE SENSING OBSTETRICAL FORCEPS

BACKGROUND OF THE INVENTION

This invention relates to obstetrical forceps for use in assisting in the delivery of a baby, and more particularly to such forceps having a device combined therewith for sensing and indicating the pressure applied to a fetus by the user of the forceps.

The medical profession has in the recent past become concerned about the degree of force applied to a fetus when using forceps to assist delivery. Recent investigations have shown that the force or pressure applied to a fetal head far exceeds what was earlier considered to be the actual pressure on the fetal head. External damages to a fetal head through the use of forceps were readily apparent. However, the degree of internal damage due to the use of forceps has never been accurately ascertained, but, since the recent discoveries of the high applied pressures to the fetal head, it is now widely accepted that internal damages do result and that excessive pressure on a fetal head should be carefully avoided. An analysis of the pressures and forces on a fetal head through the use of forceps appears in U. S. Pat. Application Ser. No. 137,169, filed Apr. 26, 1971, for "Obstetrical Forceps" in the names of Victor Jackman and Leonard E. Laufe, one of the inventors of the present invention.

Several attempts have been made to indicate and/or limit the applied pressure to a fetal head through the use of forceps. The above referred to U. S. Pat. Application discloses one such attempt. The invention of that application is a pressure limited obstetrical forceps. U. S. Pat. No. 3,665,925 to Hamo R. Dersookian is related to obstetrical forceps which mechanically indicate the applied pressure to the fetal head. Other methods of indicating the applied pressure make use of strain gauges or the like attached with electronic recording equipment. All of these modifications of obstetrical forceps have inherent drawbacks in that they require calibration prior to use, are complicated and expensive to produce, and present problems when sterilizing, especially during autoclave pressure sterilization.

SUMMARY OF THE INVENTION

The present invention provides an obstetrical forceps which allows a user to readily observe the applied pressure on a fetal head, and, further, which permits such observation through a simply and inexpensively constructed device that does not require pre-calibration each time the forceps are to be used. More particularly, our present invention preferably comprises obstetrical forceps having a pair of forcep blades pivotably connected to each other, each blade having a fetal engaging portion and a handle portion; a device for sensing the applied pressure on a fetus, such device comprising pressure means secured to at least one of the fetal engaging portions of a blade and responsive to the applied pressure on a fetal head for sensing and communicating the applied pressure; and indicating means cooperating with the pressure means and disposed in the region of the handle portions for indicating the applied pressure to the user of the forceps.

In its preferred form, the present invention includes a pressure transducer in the form of an elastomeric diaphragm arranged on the inner surface of the tip region of one of the forceps blade, and tubing filled with an incompressible fluid such as distilled water communicating between the diaphragm and a pressure indicator arranged at the handle portion of the forceps. The diaphragm and tubing are detachably secured to forceps by suitable means, as for example, surgical tape. When the forceps are used to assist in delivery of a fetus, the diaphram engages the fetus and is deflected under the applied pressure which is then instantly transmitted through the incompressible fluid in the tubing to the pressure indicator. The applied pressure may then be observed on the pressure indicator, and should the applied pressure be at or above the critical pressure, the user would loosen his grip on the forceps, thus avoiding any damage to the fetal head.

The entire construction of the pressure means of this invention may be made by injection molding of a polymeric material and thus may be made inexpensively enough to be disposable after each use. If so desired, however, the pressure means may be constructed of material which may be easily sterilized and repeatedly used. The indicator means of this invention may be any suitable pressure guage, preferably one which could be sterilized in a pressure autoclave. The pressure means assembly may also be provided with a pressure sensitive adhesive which would be applied on the back of the pressure transducer for simple attachment to all forms of forceps. Special pressure sensitive clips could be provided for attaching the tubing along the length of a forceps blade.

Various other advantages, details, and modifications of the present invention will become apparent as the following description of a present preferred embodiment thereof proceeds.

BRIEF DESCRIPTION OF THE DRAWINGS

In the accompanying drawings we have shown a present preferred embodiment of this invention in which:

FIG. 1 is a plan view showing outlet obstetrical forceps embodying the present invention and shown engaging a fetal head;

FIG. 2 is an enlarged plan view of one member of the forceps of FIG. 1, showing details of construction of the sensing device secured to such member; and FIG. 3 is a perspective view of the member of FIG. 2;

FIG. 4 is an enlarged perspective view of the tip portion of the member of FIG. 2; and FIG. 5 is a view looking along the line V—V of FIG. 4.

Referring now to the drawings, there is shown in FIG. 1 an outlet obstetrical forceps 10 embodying the present invention and shown engaging a fetal head for assisting delivery. The forceps 10 include a pair of elongated branches or members 12 and 14 pivotably connected to each other at an intermediate position along the lengths of the members to form what is commonly known as a cross-type forceps. The pivotable connection between the members 12 and 14 comprises interlocking joints 18 and 20 of any well known construction to permit free pivotable movement between the members while allowing free separation of the members without the necessity of unbolting or unscrewing parts. Member 14 comprises a blade portion 22 rigidly fixed to a handle portion 24. Blade portion 22 comprises a straight shank 22a and a smoothly curved blade 22b fixed to the shank. The blade 22b is smoothly curved for engaging a fetal head in the manner shown.

Handle portion 24 is provided with the usual contoured finger gripping surface for facilitating gripping by hand.

Member 12 includes a handle portion 26 shaped to complement handle portion 24 and together to form a complete handle for gripping by an obstetrician. Member 12 also includes a blade portion 30 having a shank 30a and a smoothly curved blade 30b, both shaped to complement tbe corresponding parts of member 14.

Member 12 has secured to it the device of the present invention for sensing the pressure applied by the user of the forceps 10 on a fetal head. The applied pressure sensing device generally designated 40 includes a pressure transducer 42 fitted to and secured on the inner surface of the tip region of blade 30b. The pressure transducer 42 includes a housing consisting of a stainless steel inner strip 44 shaped to correspond to the tip region of blade 30b, as shown in FIG. 4, and a stainless steel outer strip 46 secured to a central portion of the inner strip as with pins, for example. Outer strip 46 is provided with a central opening 48 therethrough while the inner strip 44 is provided with a side opening 50 of smaller diameter than opening 48. A hemispherically shaped diaphragm 52 formed of a resilient elastomeric material, such as silicon rubber, is fitted into the opening 48 of the outer strip 46 such that the outer surface of the diaphram protrudes outwardly of the outer strip. Thus, the outer surface of diaphram 52 will engage the fetus and deflect inwardly when the forceps 10 are being used to assist delivery. The pressure transducer 40 is detachably secured to blade 30b by surgical tape strips 54 wrapped around the inner strip 44 and the tip portion of blade 30b. Other means for securing the pressure transducer 40 to the blade 30b may be provided such as a pressure sensitive adhesive applied to the inner surface of the inner strip 44, for example.

Capillary stainless steel tubing 60 is provided as part of the pressure device 40, one end of the tubing being secured to inner strip 44 in the opening 50 thereof such that the tubing communicates with the inner confines of diaphragm 52. The length of the tubing 60 is such that it extends from the pressure transducer 40 along the outer surface of the blade 30b, the upper and inner surface of shank 30a, and the under surface of handle 26 to a pressure indicating guage 64 disposed, as shown in the figures, just above the upper surface of the rear end of handle 26. The tubing 60 is connected with the guage 64 through a fitting 66 with a filler fitting 68 being connected to the tubing just below the guage fitting 66. Filler fitting 68 is of any well known construction having for example, a spring loaded valve element through which a fluid may be charged into or discharged from tubing 60. In this embodiment of the present invention the tubing 60 and diaphram 52 are charged with an isotonic saline solution or distilled water although any incompressible fluid may be used, such as glycerin which is more suitable to autoclave sterilizing of the pressure sensing device 40. The tubing 60 is secured to the member 12 by surgical tape strips 54 as shown.

In using the forceps 10, any pressure applied to the fetal head by the user will be indicated on guage 64 since the diaphram 52 will deflect under the applied pressure and will cause the fluid in the diaphram and tubing 60 to transmit the pressure. The pressure readout on the guage 64 will thus be positive and instantaneous and easily observable by the user of the forceps. Should the applied pressure in the fetal head reach the predetermined critical pressure, the user of the forceps would observe that and would ease his grip on the handle of the forceps to reduce the pressure on the fetal head.

It should be readily understood at this point how the present invention achieves the results delineated in the introductory portion of this specification. It should also be now apparent that various modifications of the present invention are possible. For example, the pressure transducer and tubing could be injection molded of a polymeric material and charged with an incompressible fluid, and thus be inexpensively provided as a disposable unit. A special connection system between the tubing and the pressure guage could be provided for use with the disposable unit. Also, a pressure sensitive adhesive could be applied to the inner surface of the pressure transducer for easy attachment to all types and shapes of forceps. Rather than using surgical tape, pressure sensitive clips could be provided for attaching the capillary tubing along the forceps blade, shank, and handle. Another modification of the described embodiment would be to arrange in a separable manner the inner and outer strips forming part of the pressure transducer, so that the diaphram may be replaced as desired. Also, a pressure sensitive signalling device could be used in place of a guage and constructed so that a signal sounds when the critical applied pressure on the fetal head is being reached. Finally, it should also be readily recognized that the present invention contemplates divergent forceps as well as the cross-type forceps described.

While we have shown and described a present preferred embodiment of the invention, it is to be distinctly understood that the invention is not limited thereto, but may be otherwise variously embodied within the scope of the following claims.

We claim:

1. Obstetrical forceps comprising:
    a pair of elongated members, each of which has a fetal engaging blade portion at one end thereof and a handle portion at the opposite end thereof, said members being pivotably connected with each other and freely movable with respect to each other when so connected,
    pressure deformable means secured to at least one of said elongated members and responsive to the pressure applied to a fetus by the user of the forceps for sensing and communicating such applied pressure;
    pressure indicating means connected to the fetal engaging blade portions of said deformable pressure means and disposed in the region of said handle portions of said elongated members for indicating the applied pressure to the user of the forceps.

2. Obstetrical forceps as set forth in claim 1 wherein said pressure deformable means includes a pressure sensor secured to the tip section of said blade portion.

3. Obstetrical forceps as set forth in claim 1 wherein said pressure means includes a resilient member arranged to contact a fetus and constructed to be biased in a direction towards a fetus and to deflect in an opposite direction upon contact with a fetus.

4. Obstetrical forceps as set forth in claim 3 wherein said pressure means includes tubing means communicating between said resilient member and said indicating means, and pressure transmitting means contained in said resilient means and said tubing means.

5. Obstetrical forceps as set forth in claim 1 wherein said pressure means and said indicating means are detachably secured to said elongated member.

6. Obstetrical forceps as set forth in claim 4 wherein said pressure transmitting means is an incompressible fluid.

7. Obstetrical forceps as set forth in claim 6 including valve means on said tubing means for selectively charging and discharging said fluid from said pressure means.

8. Obstetrical forceps as set forth in claim 1 wherein said pressure means and said indicating means are constructed of autoclavable pressure materials.

9. Obstetrical forceps as set forth in claim 1 wherein said pressure means is constructed of a molded polymeric material.

10. In combination with obstetrical forceps including a pair of forcep blades pivotably connected to each other and having fetal engaging portions and handle portions, a device for sensing the applied pressure on a fetus, comprising:
  pressure deformable means secured to at least one of fetal engaging portions and responsive to the applied pressure on a fetus for sensing and communicating the applied pressure; and
  indicating means connected to said pressure means and constructed to be disposed in the region of the handle portions for indicating the applied pressure to the user of the forceps.

11. The combination as set forth in claim 10 wherein said pressure means includes a resilient member arranged to contact a fetus and constructed to be biased in a direction towards a fetus and to deflect in an opposite direction upon contact with a fetus.

12. The combination as set forth in claim 11 wherein said pressure means includes tubing means communicating between said resilient member and said indicating means, and pressure transmitting means contained in said resilient means and said tubing means.

13. The combination as set forth in claim 12 wherein said pressure transmitting means is an incompressible fluid.

14. The combination as set forth in claim 10 wherein said pressure means includes a pressure sensor adapted to be secured to the tip section of a fetal engaging portion of a forceps blade.

* * * * *